UNITED STATES PATENT OFFICE.

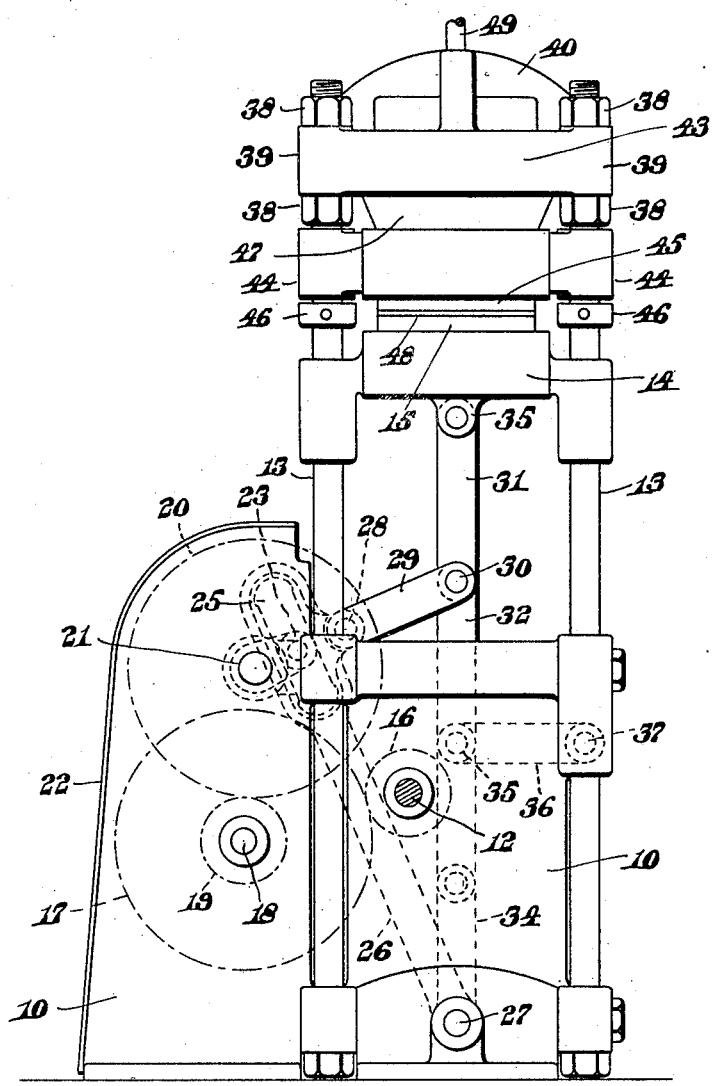

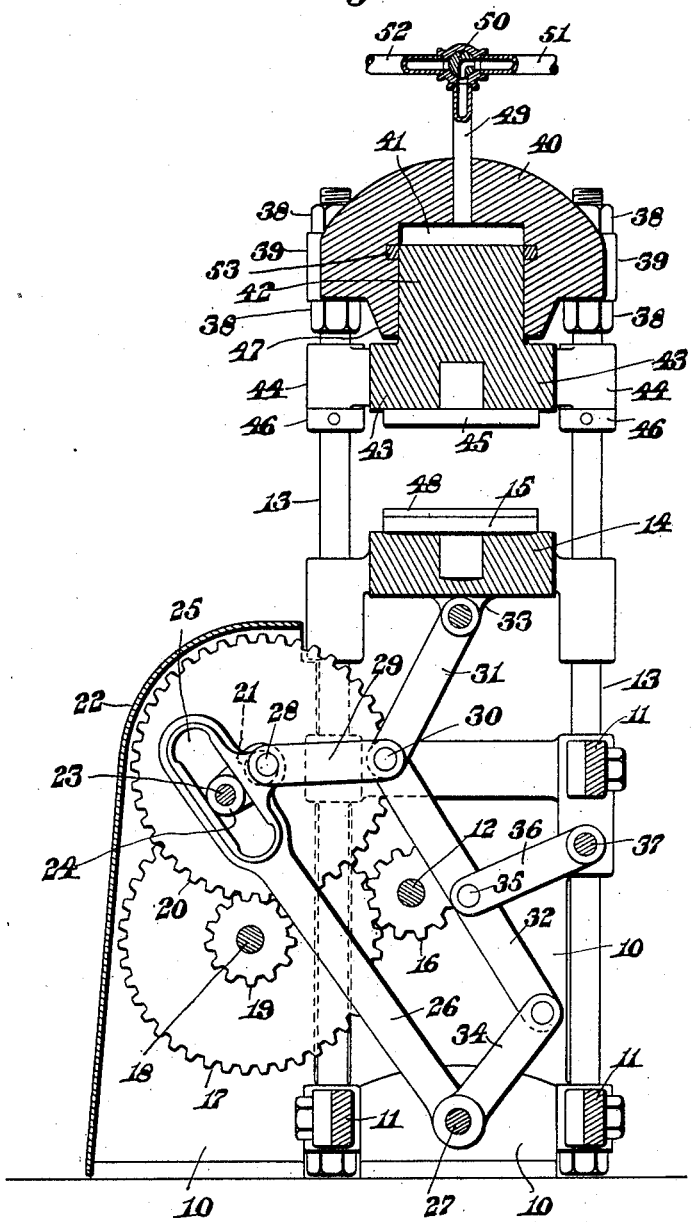

GEORGE W. PROUTY, OF MILTON, MASSACHUSETTS.

HYDRAULIC TOGGLE-PRESS.

1,382,386.      Specification of Letters Patent.      Patented June 21, 1921.

Application filed February 28, 1920. Serial No. 362,079.

*To all whom it may concern:*

Be it known that I, GEORGE W. PROUTY, a citizen of the United States of America, and a resident of Milton, in the county of Norfolk and Commonwealth of Massachusetts, have invented certain new and useful Improvements in Hydraulic Toggle-Presses, of which the following is a specification.

This invention relates to toggle presses and particularly to machines of this character designed especially to form phonographic records, and it has for its object the production of a machine in which the primary pressure of the dies is obtained by a system of toggles while a secondary pressure may be subsequently obtained by hydraulic action.

The invention consists of certain novel features of construction and arrangement of parts which will be understood readily by reference to the description of the drawings and to the claims to be hereinafter given.

For the purpose of illustrating the invention, one preferred form thereof is illustrated in the drawings, this form having been found to give satisfactory and reliable results although it is to be understood that the various instrumentalities of which the invention consists can be variously arranged and organized and the invention is not limited to the precise arrangement and organization of these instrumentalities as herein shown and described, except as required by the scope of the appended claims.

Of the drawings:

Figure 1 represents an elevation of a machine embodying the principles of the present invention with the toggles straightened, and Fig. 2 represents a vertical section of the same with the toggles broken.

Similar characters indicate like parts throughout the several figures of the drawings.

In the drawings, 10, 10 are two side frames connected together by the girts 11 and having a driving shaft 12 mounted in bearings therein.

The frames 10 have secured therein, posts or uprights 13 on which is slidably mounted the member 14 adapted to support a die 15.

The driving shaft 12 has secured thereto a pinion 16, the teeth of which mesh with the teeth of a gear 17 secured to and revoluble with a shaft 18 mounted in bearings in the side frames 10.

The shaft 18 has secured thereto and revoluble therewith, a pinion 19, the teeth of which mesh with the teeth of a gear 20 secured to and revoluble with a crank shaft 21 revoluble in bearings in the side frames 10.

The rear ends of the side frames 10 have secured thereto, a connecting plate 22 which prevents workmen from being injured by the revolving gears and other members coacting therewith.

The crank pin 23 has a roller 24 thereon disposed in an elongated slot 25 in the outer end of an arm 26 movable about the axis of the shaft 27 mounted in bearings in the side frames 10 beneath the center of the slidable member 14.

The outer end of the arm 26 is pivotally connected at 28 to one end of a link 29, the opposite end of which is connected by a pivot pin 30 to the ends of a short bar 31 and a longer bar 32.

The other end of the short bar 31 is pivotally connected to ears 33 formed upon the bottom of the slidable member 14.

The other end of the longer bar 32 is pivotally connected to the free end of a bar 34 adapted to oscillate about the shaft 27.

Intermediate the ends of the longer bar 32 is a pin 35 mounted in the end of a swinging arm 36 adapted to oscillate about the rod 37 interposed between the side frames 10.

The pin 35 serves as a fulcrum for the longer bar 32 and thereby forms a double toggle.

This toggle mechanism is in the position indicated in Fig. 2 when the member 14 is in its lowest position and at every rotation of the crank shaft 21 the roller on the crank pin 23 will move the arm 26 about the axis of the shaft 27 and by means of the link 29 will force the bars 31, 32 and 34 into a straight line as indicated in Fig. 1 of the drawings.

By means of this double toggle mechanism, the required movement of the slidable member 14 may be attained with a very short movement of the arm 31 and link 29. This is of great advantage as it economizes floor space.

The upper ends of the posts or uprights 13 are threaded and have nuts 38 thereon between each pair of which is an ear 39 of the head 40.

This head 40 may be adjusted toward and from the member 14 by varying the positions of the nuts 38 on the threaded ends of the posts 13.

The head 40 is provided with a chamber 41 in which is positioned a piston 42 formed on or secured to the member 43 having cylindrical bosses 44 surrounding the posts or uprights 13.

The member 43 is adapted to support a die 45.

Both of the members 14, 43 may have dies mounted thereon or either may support a die while the other is provided with a flat face to form a bed for the die on the other member.

Collars 46 on the posts or uprights 13 limit the downward movement of the member 44 and the annular flange 47 projecting downwardly from the member 40 limits the upward movement of said member.

When a blank 48 is placed on the die 15 and the toggle mechanism is straightened, said blank will come into contact with the die 45 and lift the member 43 until it comes into contact with the flange 47 just before the toggle bars become alined.

Further movement of the member 43 will be prevented and the continued straightening of the toggle will insure the required pressure of the dies upon the blank to give the required form to the work.

This pressure may be varied by adjusting the head 40.

In some cases where very hard material is being operated upon, it is necessary to give additional pressure of the dies upon the work and this can be accomplished by admitting fluid under pressure to the chamber 41 which will force the piston 42 downwardly.

The fluid is admitted to said chamber 41 through the pipe 49 connected by a three-way valve 50 to a supply pipe 51 and to an exhaust pipe 52.

A gasket 53 of any well-known construction surrounds the piston 42 and prevents leakage from the chamber 41.

By operating the valve 50 any desired amount of hydraulic pressure may be obtained.

The combination of a mechanical device for creating the initial pressure combined with a hydraulic device for obtaining the final pressure is of great advantage.

It is believed that the operation and many advantages of the invention will be fully understood without further description.

Having thus described my invention, I claim:

1. In a machine of the class described, two movable die-supporting members; toggle mechanism for actuating one movable member in one direction; and hydraulic means acting on the other member for creating additional pressure when the toggles are straightened.

2. In a machine of the class described, two movable die-supporting members, the upper of which is provided with a cylindrical projection; a fixed member provided with a chamber to receive said projection; means for admitting a fluid to said chamber to move the upper die-supporting member downwardly; and a toggle mechanism for moving the other die-supporting member upwardly.

3. In a machine of the class described, two movable die-supporting members, the upper of which is provided with a cylindrical projection; a fixed member provided with a chamber to receive said projection; a system of piping leading to said chamber; a three-way valve therein adapted to admit a fluid to said chamber to move the upper die-supporting member downwardly and subsequently exhaust said fluid from said chamber; and a toggle mechanism for moving the other die-supporting member upwardly.

4. In a machine of the class described, a movable die-supporting member; toggle mechanism for imparting movement thereto in one direction; a normally fixed member in the path of said die-supporting member provided with a piston chamber; a piston therein; means for supplying a fluid to said chamber to actuate said piston; and a member opposed to said die-supporting member and adapted to be moved by said piston toward said die-supporting member and create pressure upon the work supported thereby.

5. In a machine of the class described, a movable die-supporting member; toggle mechanism for imparting movement thereto; a normally fixed member in the path of said die-supporting member provided with a piston chamber; means for adjusting said normally fixed member relatively to said die-supporting member; a piston therein; means for supplying a fluid to said chamber to actuate said piston; and a member opposed to said die-supporting member and movable with said piston.

6. In a machine of the class described, a plurality of uprights; a head secured to the upper ends thereof; collars on said uprights; a member slidable on said uprights between, and limited in its movement in opposite directions by, said collars and head; a second member slidable on said uprights and coacting with the first-mentioned slidable member; a toggle mechanism for imparting movement to said second slidable member; and a die mounted on one of said slidable members.

7. In a machine of the class described, a plurality of uprights; a head secured to the upper ends thereof having a piston chamber therein; collars on said uprights; a member slidable on said uprights between, and limited in its movement in opposite directions by, said collars and head; a piston in said chamber and connected to said slidable member; means for admitting a fluid to said chamber; a second member slidable on said uprights and coacting with the first-mentioned slidable member; a toggle mechanism for imparting movement to said second slidable member; and a die mounted on one of said slidable members.

8. In a machine of the class described, two movable coöperating members; a die on one member; toggle mechanism for moving one of said members toward the other; and hydraulic means for subsequently moving the second member toward the first-mentioned member.

9. In a machine of the class described, a normally fixed head; uprights supporting said head; a member on said uprights beneath and adapted to abut said head; another member slidably mounted on said uprights beneath the first member and adapted to coact therewith; a die on one of said members; a double toggle mechanism for actuating said lower member; and operating mechanism for said toggle mechanism.

10. In a machine of the class described, a normally fixed head; uprights supporting said head; a member on said uprights beneath and adapted to abut said head; another member slidably mounted on said uprights beneath the first member and adapted to coact therewith; a die on one of said members; a double toggle mechanism for actuating said lower member; and a revoluble crank for operating said toggle mechanism.

11. In a machine of the class described, a normally fixed head; uprights supporting said head; two movable members slidably mounted on said uprights, one of which has limited movement and is adapted to be forced into contact with said head; a die on one of said members; a toggle mechanism for actuating the other member; a crank; an oscillating arm having an elongated slot through which the crank pin projects; and a link between said arm and said toggle mechanism.

12. In a machine of the class described, a normally fixed head; uprights supporting said head; two movable members slidably mounted on said uprights, one of which has limited movement and is adapted to be forced into contact with said head; a die on one of said members; a toggle mechanism for actuating the other member; a crank; an oscillating arm having an elongated slot through which the crank pin projects; a link between said arm and said toggle mechanism; and means for forcing the first-mentioned member toward the second member after the toggle has been straightened.

13. In a machine of the class described, a slidable member; a shaft; an oscillating arm thereon having a slot; a second arm on said shaft; a long bar pivoted at one end to said second arm; a short bar connected at one end by a pivot pin to the opposite end of said long bar and having its opposite end pivotally connected to said slidable member; a link between said slotted arm and said pivot pin; and a movable fulcrum for said long bar midway of its length.

14. In a machine of the class described, a slidable member; a shaft; an operating arm thereon; a second arm on said shaft; a long bar pivoted at one end to said second arm; a short bar connected at one end by a pivot pin to the opposite end of said long bar and having its opposite end pivotally connected to said slidable member; a link between said operating arm and said pivot pin; a swinging fulcrum for said long bar; and means for oscillating said operating arm.

15. In a machine of the class described, a slidable member having downwardly extending ears; a base having upwardly extending ears in alinement with the first-mentioned ears; bars pivoted to each of said ears; a connecting bar connected by pivot pins to the opposite ends of said bars; a movable fulcrum for said connecting bar; and means coacting with one of said pivot pins for bringing all three bars into alinement.

16. In a machine of the class described, a slidable member having downwardly extending ears; a base having upwardly extending ears in alinement with the first-mentioned ears; bars pivoted to each of said ears; a connecting bar connected by pivot pins to the opposite ends of said bars; a swinging arm provided at its free end with a fulcrum for said connecting bar; and means coacting with one of said pivot pins for bringing all three bars into alinement.

17. In a machine of the class described, a base; uprights thereon; a member slidable on said uprights; bars pivoted at one end to said member and base; a connecting bar connected by pivot pins to the opposite ends of said bars; a pivoted member having its free end articulated to said connecting bar intermediate its ends; and means coacting with one of said pivot pins for bringing all three bars into alinement.

18. In a machine of the class described, a base; uprights thereon; a member slidable on said uprights; bars pivoted at one end to said member and base; a connecting bar connected by pivot pins to the opposite ends of said bars; a pivoted member having its free end articulated to said connecting bar intermediate its ends; an oscillating arm; means for oscillating said arm; and a link between said arm and one of said pivot pins.

19. In a machine of the class described, a die-supporting member; a member coacting therewith; mechanical means for moving one member in one direction; and hydraulic means for subsequently imparting movement to the other member in the opposite direction.

20. In a machine of the class described, mechanical means for creating pressure upon one side of the work; and hydraulic means for creating additional pressure on the opposite side of said work.

Signed by me at 746–7 Old South Bldg., Boston, Mass., this 26th day of February, 1920.

GEORGE W. PROUTY.

Witnesses:
 WALTER E. LOMBARD,
 NATHAN C. LOMBARD.